United States Patent [19]

Blahous et al.

[11] Patent Number: 4,577,253

[45] Date of Patent: Mar. 18, 1986

[54] METHOD FOR LIMITING THE FAULT-GENERATED CURRENTS OF CIRCUIT BREAKERS IN A HIGH-VOLTAGE SWITCHING SYSTEM AND APPLICATION OF THE METHOD

[75] Inventors: Leopold Blahous, Wettingen; Georg Köppl, Birr, both of Switzerland

[73] Assignee: BBC Brown, Boveri & Company, Limited, Baden, Switzerland

[21] Appl. No.: 491,364

[22] Filed: May 4, 1983

[30] Foreign Application Priority Data

May 18, 1982 [CH] Switzerland .................. 3080/82

[51] Int. Cl.$^4$ .............................................. H02B 1/24
[52] U.S. Cl. ........................................ 361/62; 307/19; 307/112
[58] Field of Search ............... 361/62, 58; 307/112, 307/52, 59, 85, 19

[56] References Cited

U.S. PATENT DOCUMENTS

| 4,467,220 | 8/1984 | Page | 361/62 |
| 4,467,221 | 8/1984 | Koppl | 307/112 |

FOREIGN PATENT DOCUMENTS

| 379949 | 6/1973 | U.S.S.R. | 307/19 |

OTHER PUBLICATIONS

Appolt, Oeding, *Electric Power Stations and Systems,* Springer Verlag Press 1978, pp. 450-454.

*Primary Examiner*—Harry E. Moose, Jr.
*Assistant Examiner*—T. DeBoer
*Attorney, Agent, or Firm*—Burns, Doane, Swecker & Mathis

[57] ABSTRACT

In a high-voltage switching system, nodes (1, 2, ..., 8) are connected in the form of a ring via switching points (12, 23, ..., ) which in each case contain a circuit breaker. In this system, the breaking currents of the circuit breakers are to be limited and thus the breaking capacity of the circuit breakers provided in the system is to be reduced if a short-circuited part (for example node 1) is separated from a faultless part of the system. This is achieved by opening a switching point (for example 45) of the nodes connected in the form of a ring, between the contact feeders of which switching point and the non-available node (for example (1) in each case at least one available node (for example 2, 3, 4, 5, 6, 7, 8) is provided, via which a component short circuit is fed into the ring. It is of particular advantage in this case to open that switching point (for example 45) which divides the short circuit current flowing towards the short-circuited part (for example node 1) into two approximately equal halves, since then the maximum breaking current in the power-switching points (for example 12, 18) only needs to be half the maximum short circuit current of the high-voltage system.

4 Claims, 1 Drawing Figure

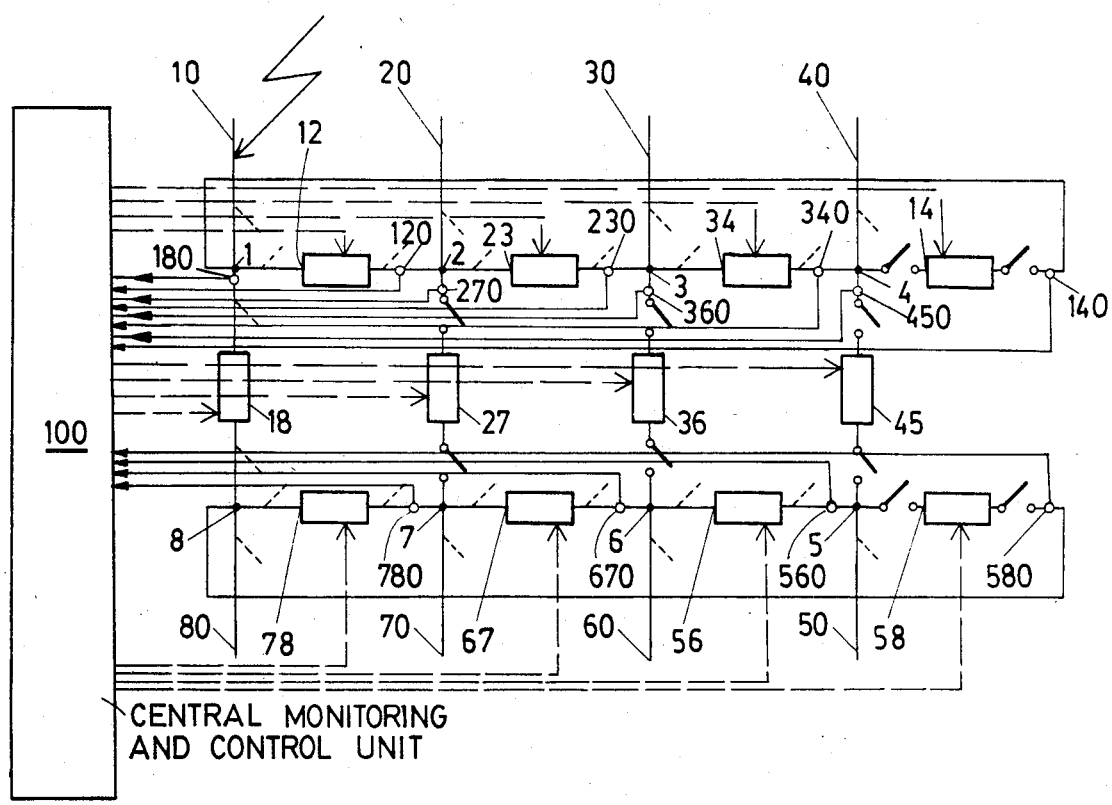

METHOD FOR LIMITING THE FAULT-GENERATED CURRENTS OF CIRCUIT BREAKERS IN A HIGH-VOLTAGE SWITCHING SYSTEM AND APPLICATION OF THE METHOD

The invention relates to a method for limiting the fault-generated, e.g. short circuit currents of circuit breakers in a high-voltage switching system when a short-circuited part is separated from a faultless part of the high-voltage switching system and an application of the method.

Such a method is already known from the book by H. Happoldt, D. Oeding: "Electric Power Stations and Systems", Springer Verlag 1978, pp. 450-454. In this method between two busbars a switch is provided which rapidly decouples the busbars in the event of a short circuit occurring in a part of the system connected to one of the two busbars. In this way a switch disposed between the short-circuited part of the system and the busbar connected to it needs only to break short circuit currents which are fed directly into the busbar associated with the short-circuited part of the system. If, however, the section switch, through which a high short circuit current flows and which is disposed between the two busbars, fails, then the circuit breaker located between the faulty part of the system and the associated busbar must break the full short circuit current. For this reason, the switch must be dimensioned for the full short circuit breaking power. In addition, the allocation of the feeder lines to the individual busbars is not freely selectable since in the event of a short circuit the section switch, of course, must handle and remove a substantial proportion (approximately 50%) of the short circuit current.

For this reason, the invention has the objective of specifying a method for limiting the breaking currents of circuit breakers in a high-voltage switching system, which method enables the necessary breaking capacity of the circuit breakers provided in the system to be considerably reduced and simultaneously to specify high-voltage switching systems in which this method can be used with particular advantage. In accordance with the invention, this object is achieved by first opening a switching point which has at least one faultless node located between it and the short-circuited node in the system. The advantage of the invention consists in particular in making it possible to use, in systems with a predetermined maximum short circuit current, cost-effective circuit breakers with a maximum breaking current which is considerably lower than the maximum short circuit current or to continue to keep in operation switches which would have to be replaced due to the increasing short circuit capacity of the system.

If the method according to the invention is further developed by opening the switching point which divides the current fed into the short-circuited node by approximately one-half, particularly cost-effective circuit breakers having a maximum breaking current of only 50 kA can be used with a maximum system short circuit current of, for example, 80 kA.

It is highly recommended to use the method according to the invention in a high-voltage switching system in which the nodes are connected to each other so that when one of the switching points is inoperative or unavailable, a partial ring arrangement of the nodes can be produced, since this makes it possible to retain the aforementioned advantages even if the original ring-shaped connection of the nodes of the system no longer exists since, for example, a switching point in this ring-shaped connection is under inspection.

In the text which follows, an illustrative embodiment of the invention is explained in greater detail with the aid of the drawing, in which:

The only FIGURE shows a switching system of a high-voltage system in which the breaking currents of circuit breakers are limited by using the method according to the invention.

In the FIGURE, nodes 1, 2, ..., 8 are represented which are connected via isolating switches (not designated) to the power connections 10, 20, ..., 80 of system parts (not shown) such as overhead lines, cables, transformers. The nodes 1 and 2, 2 and 3, 3 and 4, 4 and 5, 5 and 6, 6 and 7, 7 and 8, as well as 1 and 8 can be connected via switching points 12, 23, 34, 45, 56, 67, 78 and 18. When switching points 12, 23, ..., 18 are closed, the nodes 1, 2, ..., 8 are connected to each other in the form of a ring and form a basic ring. In addition, the nodes 1 and 4, 2 and 7, 3 and 6 as well as 5 and 8 can be connected via further switching points 14, 27, 36 and 58. Each switching point contains a circuit breaker and two isolating switches, of which each is connected on the one hand to one of the contact feeds of the circuit breaker and, on the other hand, to one of the nodes between which the switching point is located. All isolating switches are shown with a solid line when open and with dashes when closed. The further switching points 14, 27, 36 and 58 are intended for switching the nodes 1, 2, ..., 8 into the form of a ring even when the basic ring can no longer be retained, for example, because of inspection of one of the switching points 12, 23, 34, 45, 56, 67, 78 and 18. The nodes of the switching system described above are disposed in the form of a ring/cross. However, other switching systems with single or multiple redundancy like, for example, those described in Swiss Patent Application No. 6295/81-0, can also be used with advantage.

During undisturbed operation of such a high-voltage system, the isolating switches of all power connections 10, 20, ..., 80 and all switching points 12, 23, 34, 45, 56, 67, 78 and 18 disposed in the basic ring are closed. If now at one of the power connections 10, 20, ..., 80 a short circuit occurs, component short circuit currents are fed by the remaining power connections into the basic ring. In the illustrative embodiment according to the FIGURE the short circuit occurs at power connection 10. The remaining power connections 20, ..., 80 feed in component short circuit currents which add up to the short circuit current removed via the power connection 10, in accordance with Kirchhoff's law. In this arrangement, the magnitude of the component short circuit currents in the individual connections 20, ..., 80 depends on the quality of the system part connected to the power connection concerned.

In general, the magnitudes of the component short circuit currents can be predetermined as a fixed value, but can also be determined by continuous monitoring of the power connections 10, ..., 80.

If now, for example, it is found that via the connections 10, ..., 80 the component short circuit currents listed hereinafter are supplied, that is to say:

| Connection | Component short circuit current in % of total short circuit current of the complete high-voltage switching system |
|---|---|
| 10 | 20 |
| 20 | 5 |
| 30 | 25 |
| 40 | 10 |
| 50 | 5 |
| 60 | 10 |
| 70 | 20 |
| 80 | 5 | a significant stage of the method according to the invention consists, in the event of a short circuit at power connection 10 as shown in the FIGURE, in opening switching point 45, since then the short circuit current flowing off via power connection 10 is divided at 50% each onto the switching points 12 and 18, and the switching points 12 and 18 actuated after that have to switch in each case only 50% of the short circuit current. In this arrangement, the switch 45 is hardly loaded, since it switches a relatively low current which, in addition, is only a pure commutating current (without recurring voltage) and for this reason is extinguished already at the first zero transition after the contacts have separated.

If the switch 45 does not open, the switch 56 can be triggered. This causes a current division at a ratio of 45/35 to be effected which, therefore, also loads the switching points 12 and 18 with approximately equally large breaking currents which are considerably reduced with respect to the total short circuit current of the complete system. In the construction of a high-voltage switching system this represents a quite considerable advantage, since if this system is designed for a predetermined short circuit value, the circuit breakers and their associated devices and connecting lines must always be dimensioned for smaller values than the predetermined short circuit current value. In a high-voltage switching system in which the nodes are ring-connected via switching points (number of nodes n>3) and this ring can be opened by a switching point in such a manner that in each case approximately half the total short circuit current of the complete system flows towards the short circuit point from both sides, the switching points can be designed for maximum breaking current values which are only a little larger than half the predetermined short circuit current value of the high-voltage switching system.

One of the two switching points 12 and 18 carries out a rapid reclosing action. If the rapid reclosing is successful, the second switching point also closes as does, finally, the switching point 45.

In order to carry out the method according to the invention, a central monitoring and control unit can be used into which the values of the component short circuit currents, determined for example by current transformers, are entered and processed and from which the triggering commands are output to the individual switching points. Additionally, in this central monitoring and control unit, information can also be stored, for forming a new ring if it is found, for example because of an inspection, that a switching point is no longer available in the basic ring. If, for example, there is an outage of switching point 23, a new ring can be formed with all nodes 1, 2, . . . , 8 by closing the switching points 14, 27, 36 and 58 and opening the switching points 18, 67 and 45.

Current measuring devices 120, 230, 340, 140, 580, 560, 670, 780, 180, 270, 360, and 450 are located respectively adjacent switching points 12, 23, 34, 14, 58, 56, 57, 67, 78, 18, 27, 36 and 45. Any suitable measuring device may be used as, for example, a current transformer. The output of each of the current measuring devices is fed to a central monitoring and control unit 100. The central monitoring and control unit controls the closing of the switching points.

We claim:

1. A method for limiting the magnitude of the breaking currents of circuit breakers that are opened to isolate a short-circuited node in a high-voltage switching system, having nodes connected in the form of a ring by means of closed circuit breakers and a unit for monitoring the component short circuit currents fed to each of the nodes and for controlling the circuit breakers, comprising as a first step, the opening of a first circuit breaker in said ring which has at least one faultless node located between each of its terminals and the short-circuited node, and as a second step the opening of two other circuit-breakers arranged in the ring between said short-circuited node and adjacent faultless nodes.

2. The method of claim 1, further including the steps of measuring the magnitudes of the component portions of the short-circuit current that are fed to said short-circuited node from external power connections of said faultless nodes and opening said first circuit breaker which divides the short-circuit current fed to said short-circuited node approximately in half.

3. The method of claim 1 wherein the nodes of said switching system are connected to each other by means of circuit breakers in a manner such that when one of said circuit breakers is non-operative, at least a partial ring arrangement of the nodes can be provided by closing others of said circuit breakers.

4. The method of claim 2 wherein the nodes of said switching system are connected to each other by means of circuit breakers in a manner such that when one of said circuit breakers is non-operative, at least a partial ring arrangement of the nodes can be provided by closing others of said circuit breakers.

* * * * *